Sept. 4, 1951 G. C. SZIKLAI 2,566,432
CATHODE RAY BEAM DEFLECTION CIRCUIT
Filed June 25, 1949
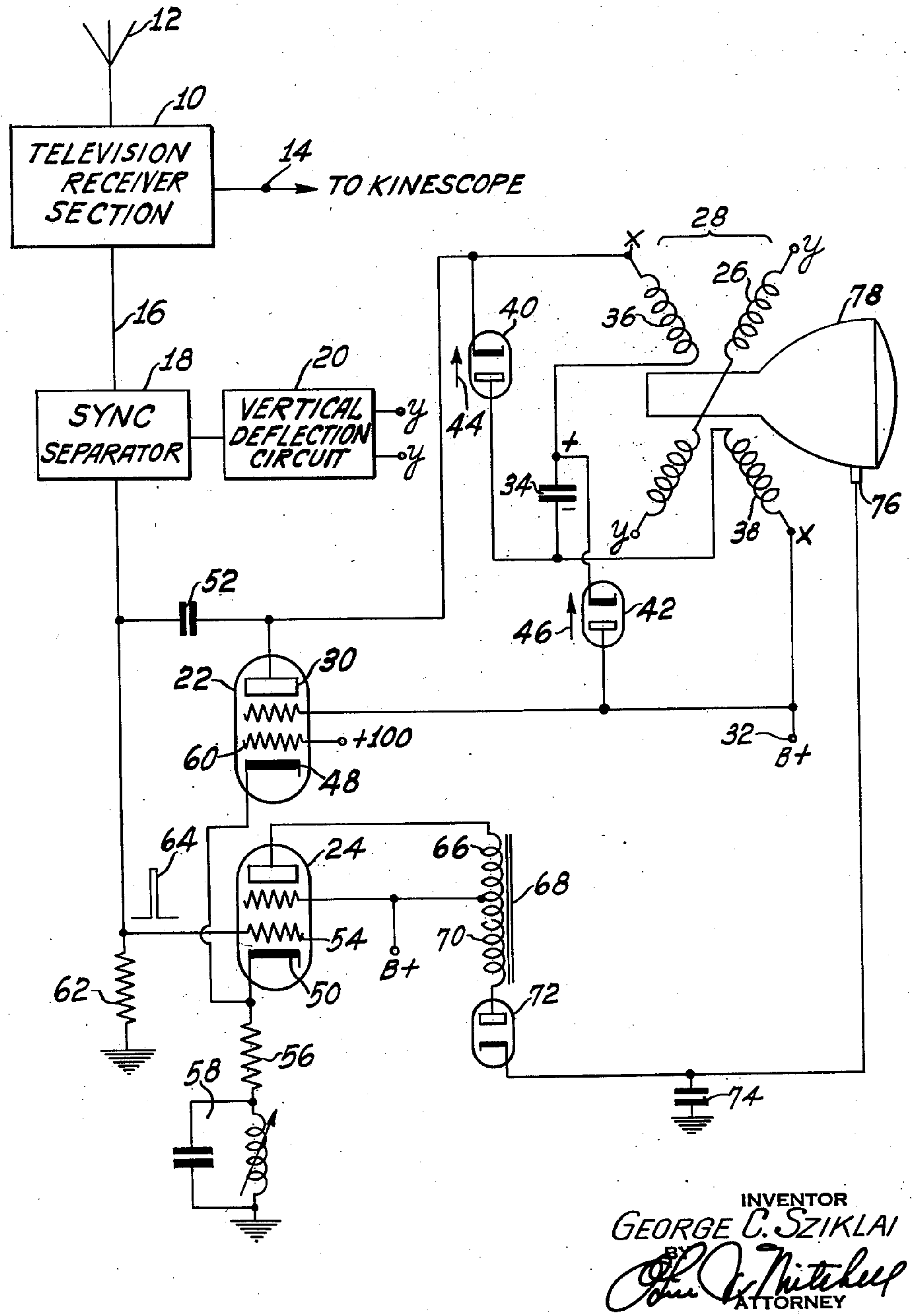
INVENTOR
GEORGE C. SZIKLAI
BY
ATTORNEY Patented Sept. 4, 1951 2,566,432

UNITED STATES PATENT OFFICE 2,566,432

CATHODE-RAY BEAM DEFLECTION CIRCUIT

George C. Sziklai, Princeton, N. J., assignor to Radio Corporation of America, a corporation of Delaware Application June 25, 1949, Serial No. 101,390

8 Claims. (Cl. 315—27)

The present invention relates to cathode ray beam deflection circuits and, more particularly, to combination type deflection circuits supplying both beam deflection energy, as well as high unidirectional beam accelerating potential, for associated cathode ray devices.

In more particularity, the present invention concerns itself with a combination type deflection circuit for cathode ray tubes which is self-acting in nature to functionally embrace a deflection signal generator action as well as a deflection signal output action in combination with means for developing a high unidirectional potential suitable for cathode ray beam acceleration.

Modern trends in the design for television receivers are more strongly emphasizing the need for more simple, compact and economical circuit arrangements, particularly of the combination variety, which achieve a plurality of circuit functions normally accomplished by respective individual circuits.

Perhaps there is no better opportunity in the design of television receivers to reap the benefits of such combination circuits than in that section of the receiver dealing with the operation of the cathode ray beam image reproducing tube. As is well known in the art, this section of the television receiver normally contains a deflection signal generator, means for synchronizing the deflection signal generator in accordance with received synchronizing information, and a deflection output stage driven by the deflection signal generator and adapted to energize an electromagnetic deflection yoke which is associated with the cathode ray beam reproducing device. Furthermore, this section of the receiver usually contains a high-voltage generating system of one kind or another which produces potentials upwards of several-thousand volts for use as a cathode ray beam accelerating potential. Unless carefully designed, the rather critical requirements of such circuit activities will absorb an undesirably high percentage of overall television receiver cost.

It is therefore a purpose of the present invention to provide a novel combination cathode ray beam deflection system which is simple and economical of construction and acts to produce not only cathode ray beam deflection influence but also develops a high unidirectional voltage output suitable for use as a cathode ray beam accelerating potential.

It is another purpose of the present invention to provide a new and improved cathode ray beam deflection circuit which employs simple direct drive electromagnetic deflection yoke connected as an integral portion of a self-acting multivibrator deflection circuit capable, in itself, of also producing high beam accelerating potentials.

In order to realize the above objects, as well as other features of advantage, the present invention contemplates the use of a two-leg multivibrator circuit having an electromagnetic deflection yoke directly connected with the output of one leg while employing a pulse step-up transformer device in the output circuit of the other leg. Pulse step-up energy derived from the pulse step-up device is then rectified to produce a high unidirectional potential for the use of cathode ray beam acceleration while any suitable form of damping circuit is placed in shunt with the deflection yoke for control of the current waveform therethrough.

Other objects and advantages of the invention will become apparent from the following description taken in connection with the accompanying drawing in which:

The figure shows one form of the present invention as applied to a typical television receiver circuit.

Referring now to the figure, there is represented in block form at 10 conventional components of a television receiving circuit such as, for example, described in an article by Antony R. Wright entitled "Television Receivers" appearing in the March 1947 issue of the RCA Review. Signals are received by the antenna 12, superheterodyned, amplified, demodulated, again amplified, and made available to the output terminal 14 indicated for connection with the control electrode of a kinescope or image reproducing device. Some of the demodulated signal is also supplied by a connection 16 to a sync separator circuit 18 which, in the conventional manner, differentiates between the received vertical and horizontal synchronizing pulses and applies them for respective synchronization of the vertical deflection circuit represented by block 20 and the horizontal deflection circuit comprising vacuum tubes 22 and 24. As indicated, the output terminals Y—Y of the vertical deflection circuit are intended for connection with the terminals Y—Y of the vertical winding 26 included in the electro-magnetic beam deflection yoke 28.

According to the present invention, the horizontal deflection winding of the yoke 28, having terminals X—X, is adapted for excitation from the horizontal deflection output tube 22. In the particular arrangement shown, the winding X—X is connected between the anode 30 of the output tube 22 and a source of positive biasing potential 32, a "B" boost storage capacitor 34 being connected between the inner extremities of the horizontal deflection winding sections 36 and 38. This arrangement of the "B" boost capacitor 34, as well as the positioning of the damping diodes 40 and 42 provides an effective and efficient form of power recovery damping circuit permitting power recovery in the form of a boost in applied "B" potential to the anode 30. Detailed operation of this particular power recovery arrangement has no bearing whatever upon the nature and operation of the present invention and therefore will not be discussed at length. Details of the advantages and features of this particular form of direct-drive deflection circuit are, however, fully described in U. S. Patent No. 2,555,828 granted June 5, 1951 to Allen A. Barco, entitled "Power Recovery Damping System." It suffices here to note that magnetic energy stored in the respective sections 36 and 38 of the horizontal winding is damped and cyclically recovered during the retrace of the deflection cycle by current flow through damping diodes 40 and 42. This current flow is in the direction of the arrows 44 and 46 such that the current will tend to charge the "B" boost storage capacitor with the polarity indicated. The power thereby recovered and manifested as a potential across the "B" boost capacitor 34, acts to increase the positive potential appearing at the output tube anode 30 in excess of that otherwise obtainable from the positive "B" supply terminal 32.

In further accordance with the present invention, the deflection output discharge tube 22 receives its drive by connection of its cathode 48 with the cathode 50 of the driver tube 24. As will be seen hereafter the output tube 22 and driver tube 24 are, in fact, connected in multivibrator fashion to sustain oscillation at a desired sweep deflection frequency.

This multivibrator connection is as follows: a feedback capacitor 52, connected with the anode 30 of the output tube 22, is connected with the control grid 54 of the driver tube 24. Since, as described, the cathode circuits of both the output tube and the driver tube are connected together and made to include a resistance 56, as well as a tuned circuit 58, any positive increase in the potential of the control grid 54 of the driver tube will cause a corresponding decrease of the anode current in the output tube 22. A decrease in the output tube anode current will, of course, increase the potential appearing at the anode 30, which increase, as coupled through the capacitor 52, will further swing the control grid 54 of the driver tube 24 in a positive direction.

As the voltage on the control grid 54 of the driver tube continues to go more positive, the output tube 22 will eventually be cut off, which will represent a cessation of current flow through the windings 36 and 38, permitting the starting of free resonant sinusoidal oscillation at a suitable retrace frequency. At the end of the retrace cycle, the voltage applied to the control grid 54 of the driver tube 24 will be reduced, resulting in a reduction of the positive voltage appearing at the output tube cathode 48. This, of course, represents a decrease in the control potential appearing between the control electrode 60 of the output tube and the cathode 48 so as to cause current flow through the output tube to again be established. This effective positive-going increase of the control electrode 60, relative to the cathode 48 of the output tube, will continue as the cathode goes more negative up to the point where the grid 60 is positive with respect to the cathode 48. As in most multivibrator circuits of this general type, the frequency of the self-oscillation will be defined by the time constant established by the grid resistance 62 and the coupling capacitor 52.

As indicated hereinabove, the separated horizontal synchronizing pulses derived from the sync separator 18 are applied to the control grid 54 of the driver tube 24 to properly time the operation of the deflection circuit. For the arrangement shown, the needful polarity of the applied horizontal synchronizing pulses 64 would, of course, be in the positive-going direction so as to initiate the positive excursion of the grid 54 of the driver tube which, as shown above, establishes the beginning of the deflection cycle retrace interval.

As the interval of greater conduction in the desired driver tube 24 therefore corresponds to the relatively short return time of the scanning cycle, there will appear a short duration current pulse in the anode circuit of the driver tube. This pulse will, of course, have rather steep and abrupt contour characteristics. Therefore, in accordance with the present invention, there is placed in the anode circuit of the driver tube 24, the primary 66 of a high-voltage pulse step-up transformer 68, which has its high turns ratio secondary 70 connected with the diode 72. It can therefore be seen that by adjusting the turns ratio of the secondary 70 to the primary 66 of the pulse step-up transformer, a substantial high-voltage transient of several thousand volts or more may be applied to the diode 72 during the retrace interval of the deflection cycle. The energy of these high-voltage transients or pulses when stored in the capacitor 74 forms a convenient source of accelerating potential for application to the accelerating anode 76 of the image reproducing tube 78.

In the practice of the present invention, the tuned circuit 58, appearing in the cathode circuits of the driver and output tubes, is tuned to a harmonic of the desired deflection frequency. The voltage appearing across the resonant circuit 58 then acts as a stabilizing signal in the multivibrator circuit and tends to minimize frequency drift of the circuit as well as increase the immunity of the circuit against missynchronization in response to noise signal. Moreover, direct application of the synchronizing pulse 64 to the driver control electrode 54 may be replaced by any well-known form of deflection circuit AFC system which develops a direct-current control potential representative of the degree of synchronization between the incoming synchronizing signals and the actual operating frequency of the deflection circuit itself. The direct-current control voltage so developed then would be applied directly to the control electrode 54 of the driver tube in lieu of the synchronizing pulse 64. This modification will be clear to those skilled in the art to which this invention pertains and is shown in general form in the above-mentioned article "Television Receivers" by Antony Wright.

As noted above, the present invention is in no way limited in its successful utilization by the particular form of deflection arrangement coupled with the anode circuit of the output tube 22. It may be desirable in some instances to include a more conventional coupling transformer arrangement or still even other forms of "B" boost direct-drive circuits. Furthermore, the high-voltage pulse step-up autotransformer 68 may be replaced by numerous other pulse step-up devices of the autotransformer variety or otherwise. It will be further apparent that the embodiment of the present invention need not necessarily include two pentode type tubes although, in practice, it is generally preferable to use pentode types. Obviously, the advantages of the present invention may be applied to any type of deflection circuit for electron tube devices and the developed high-voltage developed thereby employed for operating either the electron device itself or allied equipment.

Having thus described the invention, what I claim is:

1. In a cathode ray beam deflection system employing an electromagnetic beam deflection yoke, first and second amplifier devices, each having an input and an output circuit, connections between the first amplifier device output circuit and the second amplifier device input circuit, connections between the second amplifier device output circuit and the first amplifier device input circuit such to produce self-sustained oscillation between said first and second amplifiers, a resonant stabilizing circuit connected between said first and second amplifier devices so as to be common to the input and output circuits of said first and second amplifiers, the frequency of said resonant circuit being harmonically related to the said circuit deflection frequency means connected with said first amplifier device output circuit for rectifying alternating voltage pulses appearing thereat to produce a unidirectional biasing potential, connections for applying said biasing potential to a cathode ray beam device and means for coupling the beam deflection yoke with the output circuit of said second amplifier for actuation thereby.

2. A cathode ray beam deflection circuit adapted for driving an electromagnetic deflection yoke associated with a cathode ray beam device, said circuit comprising in combination, first and second electron discharge tubes, each having at least an anode, a cathode and a control electrode, connections placing the control electrode-cathode circuits of said discharge tubes in regenerative relationship with the anode-cathode circuits of said discharge tubes such to sustain oscillation between said discharge tubes at a given beam deflection frequency, an electromagnetic pulse step-up device serially connected in the anode-cathode circuit of said first electron discharge tube, rectifying means connected with the output of said pulse step-up device whereby to derive a unidirectional potential from alternating voltage produced thereby, connections for applying said unidirectional voltage to the cathode ray beam device associated with the deflection yoke, and connections placing said deflection yoke in series with the anode-cathode circuit of said second discharge tube.

3. Apparatus according to claim 2 wherein there is additionally provided parallel tuned circuit having a resonant frequency harmonically related to the desired beam deflection frequency, and connections placing said tuned circuit in series with the input and output circuits of said first and second discharge tubes.

4. Apparatus according to claim 3 wherein said first and second discharge tubes are of the pentode variety.

5. In a deflection circuit for a cathode ray tube having associated therewith an electromagnetic deflection yoke, the combination of: the first and second electron discharge tubes having at least an anode, a cathode, and control electrode, a positive power supply terminal, a point of reference potential, a connection between said first and second discharge tube cathode, an impedance connected between the cathodes of said discharge tubes and said point of reference potential, an electromagnetic pulse step-up device having input terminals and output terminals, connections placing said pulse step-up device input terminals in series with connections between said first discharge tube anode and said positive power supply terminal, a voltage rectifying device connected with the output terminals of said voltage step-up device for deriving a unidirectional potential, an alternating current energy produced thereby, connections for applying said unidirectional potential as a beam influencing biasing in said cathode ray beam device, connections placing said electromagnetic deflection yoke between the anode of said second discharge tube and said positive power supply terminal, and damping means connected in shunt with said deflection yoke.

6. Apparatus according to claim 5 wherein said impedance connected between said discharge tube cathodes and said point of reference potential includes a parallel tuned circuit having a resonant frequency multiply related to the desired beam deflection frequency of the deflection circuit.

7. Apparatus according to claim 5 wherein said electromagnetic pulse step-up device comprises an autotransformer such that its primary winding is included in the anode-cathode circuit of said first discharge tube and its secondary winding is in shunt with said voltage rectifying means.

8. Apparatus according to claim 5 wherein said first discharge tube is of the pentode variety.

GEORGE C. SZIKLAI.

REFERENCES CITED

The following references are of record in the file of this patent:

UNITED STATES PATENTS

| Number | Name | Date |
|---|---|---|
| 2,074,495 | Vance | Mar. 23, 1937 |
| 2,300,524 | Roberts | Nov. 3, 1942 |
| 2,369,631 | Zanarini | Feb. 13, 1945 |
| 2,397,150 | Lyman | Mar. 26, 1946 |
| 2,431,766 | Miller et al. | Dec. 2, 1947 |
| 2,443,030 | Foster | June 8, 1948 |